United States Patent [19]

Anderson

[11] 4,275,707
[45] Jun. 30, 1981

[54] VENTILATING SYSTEM COLLAR WITH LOCK MEANS

[75] Inventor: Ronald A. Anderson, Villa Park, Ill.

[73] Assignee: The Lockformer Company, Lisle, Ill.

[21] Appl. No.: 60,970

[22] Filed: Jul. 26, 1979

[51] Int. Cl.$^3$ .............................................. F23J 13/04
[52] U.S. Cl. ................................... 126/318; 138/156; 138/155; 138/162
[58] Field of Search .............. 98/40 C; 138/156, 155, 138/163, 165, 166, 168, 167; 220/76; 126/314, 316, 318

[56] References Cited

U.S. PATENT DOCUMENTS

| | | | |
|---|---|---|---|
| 219,645 | 9/1879 | Miller | 220/76 |
| 1,028,830 | 6/1912 | Reuterdahl | 138/162 |
| 1,284,064 | 11/1918 | De Lano | 138/156 |
| 2,406,164 | 8/1946 | Raisz | 220/76 |

FOREIGN PATENT DOCUMENTS 632423  12/1961  Canada ................................... 138/156

*Primary Examiner*—Larry I. Schwartz
*Assistant Examiner*—Henry Bennett
*Attorney, Agent, or Firm*—McDougall, Hersh & Scott

[57] ABSTRACT

This invention relates to a ventilating system of the type comprising a duct for distributing heated or cooled air with distribution pipes attached to the duct. Each pipe is attached by means of a collar which has one side connected to the duct and the opposite side providing means for holding a pipe end. The collar includes integrally formed lock means which permit formation of the collar from a strip and joining of the strip ends to provide the desired collar configuration. The lock means include a projection on one end of the collar strip, the projection defining an outer edge and angularly, inwardly extending side edges. This projection is receivable within a notch defined by the other end of the collar strip. The notch includes an inner edge and angularly and inwardly directed side edges with collar portions formed on opposite sides of the notch. The projection can be quickly inserted in the notch, and a secure relationship is achieved.

3 Claims, 5 Drawing Figures

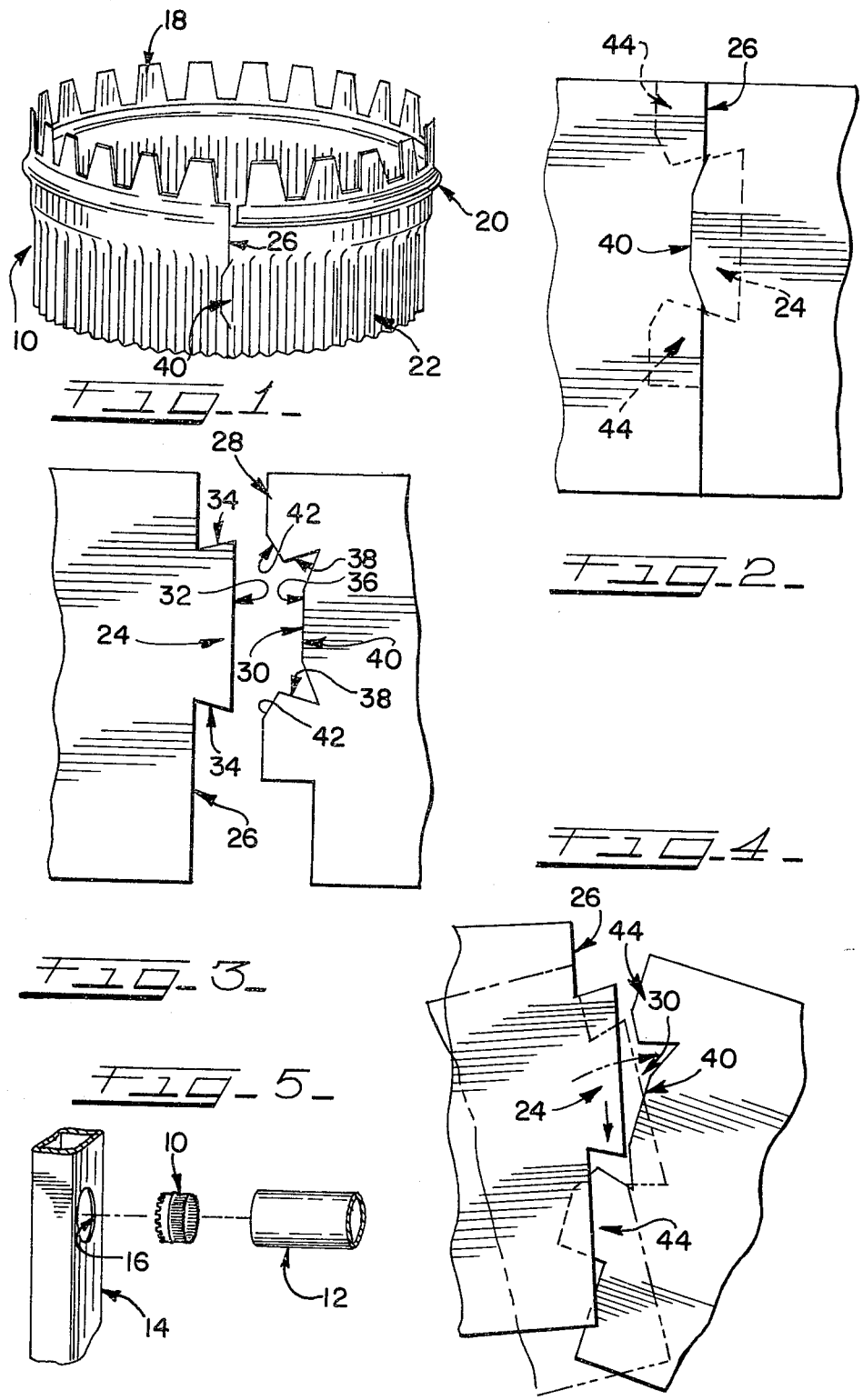

VENTILATING SYSTEM COLLAR WITH LOCK MEANS

BACKGROUND OF THE INVENTION

The invention is directed to ventilating systems which may be utilized for handling heated or cooled air. In a typical system, a duct is connected to a furnace or air conditioning system, and distribution pipes are connected at intervals to the duct. This is accomplished by forming holes in the duct walls and providing collars whereby one side of the collars can be secured at the hole, and pipe sections then attached to the collars.

Collars of the type referred to are generally formed from strips of metal. Copending application Ser. No. 912,509, entitled Rotary Notcher and Former, illustrates equipment of a type which may be utilized for producing collars. That arrangement includes means for providing a notched edge on one side of a strip whereby tabs are formed. These tabs can then be bent back after this side of the collar is inserted in a duct hole whereby the collar will be secured in position.

The apparatus will also form a bead in the strip whereby the position of the collar relative to the duct hole can be accurately determined. Finally, the apparatus produces a crimped section along the opposite side of the strip. When the collar is formed and located in position, a pipe end can then be conveniently fit around this crimped section.

In utilizing formed strips of the type referred to, it is desirable to lock the opposite ends of the strip together whereby a collar of a desired configuration, for example rectangular or circular, will be achieved. By locking the strip ends together, it is also much easier to handle the collars when attaching them to a duct and when placing a pipe end in position.

Various lock designs have been utilized. In a typical design, the strip ends are bent to provide return portions and one can then be interlocked with the other by locating the respective return portions in a gripping relationship.

SUMMARY OF THE INVENTION

In accordance with this invention, lock means are provided for collars whereby the ends of a formed strip can be very easily and securely attached together to achieve a collar configuration. The lock means are formed integrally with the collar by means of simple stamping operations whereby the protection of the lock means is also achieved in a highly efficient fashion.

The lock means of the invention comprises a projection formed at one end of the collar. This projection consists of an outer edge portion extending substantially parallel with the one end, and side edges extending angularly inwardly from the outer edge toward the one end.

The other end of the collar comprises a notch which defines an inner edge extending substantially parallel with the other end. Side edges of the notch extend angularly inwardly from the inner edge toward the other end. In the preferred form of the invention, a centrally located tab defines the inner edge of the notch. When the projection is received in locking relationship relative to the notch, the projection, as well as collar portions on opposite sides of the notch, overlap the collar surface on one side of the collar. The tab portion provides a secure locking relationship by overlapping a collar surface portion on the opposite side of the collar.

BRIEF DESCRIPTION OF THE DRAWINGS

FIG. 1 is a perspective view of a collar characterized by the features of this invention;

FIG. 2 is an enlarged fragmentary view illustrating the locking means of the collar in locking relationship;

FIG. 3 is an enlarged fragmentary view illustrating the locking means of the collar when separated;

FIG. 4 is an enlarged fragmentary view illustrating the manner in which the projection of the locking means is located in locking position relative to the notch of the locking means; and, FIG. 5 is a schematic illustration of the manner in which a duct and pipe are attached utilizing the collar.

DESCRIPTION OF THE PREFERRED EMBODIMENT

FIG. 1 of the drawings illustrates a collar 10 characterized by the features of this invention. This collar is adapted to serve as a connector for assembling a pipe section 12 to a duct 14 (FIG. 3). As shown, the duct defines an opening 16, and the side of the collar defining tabs 18 is adapted to be inserted in this opening. Once the tabs are located within the duct, they can be bent 90° for thereby preventing removal of the collar from the opening.

A bead 20 is formed in the collar, and this bead has a diameter exceeding the diameter of opening 16. Accordingly, the bead serves to automatically control the position of the collar relative to the duct.

The other side of the collar defines a crimped section 22. In the normal fashion, the crimping operation serves to develop a slight taper in the collar thereby simplifying the location of the pipe 12 around this section of the collar. Thus, the inner diameter of the pipe will only slightly exceed the outer diameter of the outer end of the crimped section. The pipe section can then be forced inwardly to provide a friction fit between the pipe section and collar.

As explained, the collar is normally produced as a flat strip. The circular configuration illustrated is achieved by simply bringing the two ends of the strip together. If desired, the structure could be formed into a different shape, for example rectangular.

It is advantageous to firmly secure the ends of the collar strip together, and FIGS. 2 through 4 illustrate the lock means which have been found to be particularly suited for this purpose. The lock means consists of a projection 24 extending outwardly from one end 26 of the collar strip. The other end 28 of the collar strip defines a notch 30. For convenience of illustration, the tabs, bead, and crimp section are not illustrated; however, the relationship of the lock means to the structure of FIG. 1 will be readily understood when considering that figure.

The projection 24 defines an outer edge 32 which extends substantially parallel with the strip end 26. Side edges 34 of the projection extend angularly inwardly from the edge 32, and these edges terminate at the outer end 26. The side edges are disposed at an angle of approximately 15° relative to the axis of the strip, and it is contemplated that this angle vary plus or minus 5°.

The notch 30 is characterized by an inner edge portion 36 extending substantially parallel to the end 28. Side edges 38 of the notch extend angularly inwardly from the inner edge toward the strip end 28. These inner edges are disposed at approximately the same angle as the edges 34.

In the preferred form of the invention, the inner edge 36 extends angularly rearwardly at an angle of about 20° to junctures with the side edges 38. This results in the formation of a tab section 40 which, as will be shown, achieves a particularly secure locking relationship.

It is also preferred that the inner edges 38 terminate short of the end 28 with edge portions 42 extending outwardly at an angle of about 30° from the inner edges 38 to the end 28. This provides relieved corners for the notch which simplifies the interengagement of the projection and notch. This angle, as well as the 20° angle referred to, may also vary about plus or minus 5°.

FIG. 4 illustrates the stages of an assembly operation. As shown, the projection 24 is adapted to be inserted into the notch 30 and beneath the tab section 40. This is achieved by moving a corner of the tab section at an angle into the notch, and bringing the apex defined between the projection and end 26 into approximate correspondence with the apex defined by the inner edge 40 and one side edge 38. Once this has occurred, the projection can be pivoted inwardly whereby the other set of apices are brought into approximate correspondence.

It will be noted that collar portions 44 are defined on opposite sides of the notch 30. As best shown in FIG. 2, these collar portions overlapping the same collar surface portion as the projection 24 when the lock means is assembled. It will also be noted that the tab 40 extends in overlapping relationship with the opposite surface of the collar. Thus, the lock means provides overlapping portions relative to both surfaces of the assembled collar. This relationship, coupled with the interlocking achieved due to the substantial co-incidence of the respective apices, results in an extremely secure structure.

The arrangement of the invention is highly advantageous, particularly because of the fact that both the projection and notch are easily formed in a simple stamping operation. No special bending in either area is required, it being understood, however, that since the lock means are located in the crimping section of the collar, they will not necessarily be flat because of the action of the crimping tool.

It will be understood that various changes and modifications may be made in the structure described which provide the characteristics of the invention without departing from the spirit thereof particularly as defined in the following claims.

That which is claimed is:

1. In a ventilating system comprising a duct for the passage of heated or cooled air, a distribution pipe attached to the duct, and a collar providing the means for securing the pipe to the duct, the improvement wherein said collar comprises locking means for securing the opposite ends of the collar together, said locking means comprising a projection extending outwardly from one end of the collar, said projection defining an outer edge extending substantially parallel with said one end, and said projection defining side edges extending angularly inwardly from said outer edge toward said one end, the other end of said collar defining a notch for receiving said projection, an inner edge defined by said notch extending substantially parallel with said other end, and side edges defined by said notch extending angularly inwardly from said inner edge toward said other end, and including collar portions extending outwardly from the respective side edges of said notch, said projection being received in said notch and extending beyond said inner edge of said notch, said collar portions extending beyond said one end on the same side of the collar as said projection, and including an intermediate tab portion defined by said inner edge, said tab portion extending beyond said one end on the side of the collar opposite said collar portions when the projection is received in the notch.

2. A construction in accordance with claim 1 wherein said tab portion comprises an intermediate edge extending substantially parallel with said other end, and two oppositely directed edges extending angularly inwardly to a junction with said side edges of said notch.

3. A construction in accordance with claim 2 wherein said collar portions each define a relieved corner on opposite sides of said notch, each relieved corner comprising an edge extending angularly inwardly from said other end to a junction with a side edge of said notch.

* * * * *